US009301320B2

(12) United States Patent
Nandagopalan

(10) Patent No.: US 9,301,320 B2
(45) Date of Patent: Mar. 29, 2016

(54) METHOD AND SYSTEM FOR METHOD AND SYSTEM FOR CARRIER SENSE MULTIPLE ACCESS WITH COLLISION AVOIDANCE (CSMA/CA) WITH DIRECTIONAL TRANSMISSION

(75) Inventor: Saishankar Nandagopalan, San Diego, CA (US)

(73) Assignee: Broadcom Corporation, Irvine, CA (US)

( * ) Notice: Subject to any disclaimer, the term of this patent is extended or adjusted under 35 U.S.C. 154(b) by 1307 days.

(21) Appl. No.: 12/423,589

(22) Filed: Apr. 14, 2009

(65) Prior Publication Data

US 2010/0014457 A1     Jan. 21, 2010

Related U.S. Application Data

(60) Provisional application No. 61/045,276, filed on Apr. 15, 2008.

(51) Int. Cl.
| | |
|---|---|
| *H04W 4/00* | (2009.01) |
| *H04J 3/00* | (2006.01) |
| *H04W 74/08* | (2009.01) |
| *H04W 16/28* | (2009.01) |
| *H04W 72/04* | (2009.01) |

(52) U.S. Cl.
CPC .......... *H04W 74/0816* (2013.01); *H04W 16/28* (2013.01); *H04W 72/0406* (2013.01)

(58) Field of Classification Search
USPC ........................................................ 370/328
See application file for complete search history.

(56) References Cited

U.S. PATENT DOCUMENTS

| 2006/0182080 | A1* | 8/2006 | Yang et al. ..................... 370/347 |
| 2008/0026797 | A1* | 1/2008 | Nanda et al. ............... 455/562.1 |
| 2008/0153502 | A1* | 6/2008 | Park et al. ..................... 455/446 |

OTHER PUBLICATIONS

NPL document IEEE Std 802.11-2007, Part 11: Wireless LAN Medium Access Control (MAC) and Physical Layer (PHY) Specifications, IEEE, 3 Park Avenue, New York, NY 10016-5997, Jun. 12, 2007.*

* cited by examiner

*Primary Examiner* — Gregory Sefcheck
*Assistant Examiner* — Majid Esmaeilian
(74) *Attorney, Agent, or Firm* — Oblon, McClelland, Maier & Neustadt, L.L.P.

(57) ABSTRACT

Aspects of a method and system for carrier sense multiple access with collision avoidance (CSMA/CA) with directional transmission are presented. Aspects of the system may include a communicating device (DEV), which transmits a portion of a PDU utilizing omnidirectionally transmitted signals and a subsequent portion of the PDU utilizing directionally transmitted signals. In an exemplary system the communicating DEV may transmit a frame, which represents a physical layer PDU. The frame may comprise a physical layer convergence procedure (PLCP) preamble that is transmitting utilizing omnidirectionally transmitted signals (omni preamble), a PLCP header that is transmitted utilizing omnidirectionally transmitted signals (omni header), a PLCP preamble that is transmitted utilizing directionally transmitted signals (directional preamble) and a physical layer service data unit (PSDU) field, or data, field, which is transmitted utilizing directionally transmitted signals (directional data). In another exemplary system, the communicating DEV may transmit PDUs utilizing directional signal transmission.

19 Claims, 12 Drawing Sheets

METHOD AND SYSTEM FOR METHOD AND SYSTEM FOR CARRIER SENSE MULTIPLE ACCESS WITH COLLISION AVOIDANCE (CSMA/CA) WITH DIRECTIONAL TRANSMISSION

CROSS-REFERENCE TO RELATED APPLICATIONS/INCORPORATION BY REFERENCE

This application makes reference to, claims priority to, and claims the benefit of U.S. Provisional Application Ser. No. 61/045,276 filed Apr. 15, 2008, which is incorporated herein by reference in its entirety.

This Application makes reference to:
U.S. patent application Ser. No. 12/401,222 filed Mar. 10, 2009; and
U.S. patent application Ser. No. 12/397,435 filed on Mar. 4, 2009.

Each of the above stated applications is hereby incorporated herein by reference in its entirety.

FIELD OF THE INVENTION

Certain embodiments of the invention relate to data communication. More specifically, certain embodiments of the invention relate to a method and system for CSMA/CA with directional transmission.

BACKGROUND OF THE INVENTION

IEEE 802.15 describes a communication architecture, which may enable communicating devices (DEVs) to communicate via wireless personal area networks (WPANs). Many DEVs utilized in WPANs are small or handheld devices, such as personal digital assistants, portable computers, or consumer electronics devices such as digital video recorders or set top boxes. IEEE 802.15 is a short-range wireless communications standard that enables connection between consumer and computer equipment while eliminating wires. IEEE 802.15 WPAN DEVs may utilize frequencies in the 57 GHz to 66 GHz range for communication.

A plurality of communicating DEVs in a WPAN environment may comprise a network known as a piconet. One of the DEVs in a piconet may function as a piconet coordinator (or controller), or PNC. The PNC may provide overall coordination for the communication between DEVs in a piconet. The piconet may comprise the PNC and DEVs, which are associated with the PNC.

The DEVs may communicate through the transmission and/or reception of protocol data units (PDU) referred to as frames. A frame may correspond to a PDU that is associated with a physical (PHY) layer protocol in a protocol reference model (PRM). The frame may comprise a physical layer convergence procedure (PLCP) preamble field, a PLCP header field and a physical layer service data unit (PSDU) field. The PLCP preamble field is utilized by a receiver of the PDU to detect a potentially receivable signal and to establish frequency and/or timing synchronization with the received PDU. The PLCP header field is utilized by a receiver of the PDU to determine the length of the PSDU field, typically measured in octets, and to determine a data rate for data contained within the PSDU field. The PSDU field may be referred to as a payload field. The payload field may comprise data that are being communicated from a source DEV to a destination DEV.

Radio frequency (RF) communications between communicating devices via the wireless communication medium within the 60 GHz frequency range are typically directional in nature. Thus transmitting DEVs may transmit RF signal energy from a given antenna in a given direction while not transmitting RF signal energy in other directions from the given antenna. Thus, given two potential recipient DEVs located at, for example, equal distances in opposite physical directions relative to a transmitting DEV, a potential recipient DEV which is in the direction of RF signal energy transmission may receive signals from the transmitting DEV while the other potential recipient DEV may not.

Prior to attempting to transmit signals via the wireless communication medium, a communicating DEV, which utilize the CSMA/CA protocol, typically attempts to determine whether there are any DEVs that are transmitting signals via the wireless communication medium. This determination is referred to as a clear channel assessment (CCA). When the CCA indicates that there are no other DEVs, which are transmitting signals, the communicating DEV may determine that the wireless communication medium is available for transmission of signals. The communicating DEV may attempt to reserve the wireless communication medium for signal transmission for a given time duration by transmitting a request to send (RTS) frame. The RTS frame may identify the communicating DEV as a source DEV and may also identify one or more destination DEVs. In response, one or more destination DEVs identified in the RTS frame may send a clear to send (CTS) frame to the source DEV. After completing the RTS/CTS frame exchange, the source DEV and destination DEV(s) may communicate by sending frames via the wireless communication medium.

Because of the directional nature of 60 GHz signal transmission, the effectiveness of CSMA/CA protocol in achieving collision avoidance may be impaired due to capture effect and/or deafness. Deafness is a phenomenon, which is observed at a transmitting DEV, in which a plurality of transmitting DEVs concurrently transmit signals via the wireless communication medium, wherein because of the directional nature of each transmitting signal, each transmitting DEV may not detect the signals being transmitted by the other transmitting DEVs. In other words, because of the inability to detect the energy from signals transmitted by other transmitting DEVs, the CCA performed at each transmitting DEV may indicate that the wireless communication medium is available for signal transmission.

Capture effect is a phenomenon, which is observed at a receiving DEV. Because the various transmitted signals may be received at the respective destination DEVs with differing signal-to-interference plus noise ratios (SINR), PDUs received via signals with higher SINR values may be successfully received at the corresponding destination DEV(s) while PDUs received via signals with lower SINR values may not be successfully received at the corresponding destination DEV(s).

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A method and system for CSMA/CA with directional transmission, substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

DETAILED DESCRIPTION OF THE INVENTION

Certain embodiments of the invention may be found in a method and system for carrier sense multiple access with collision avoidance (CSMA/CA) with directional transmission. Various embodiments of the invention comprise a method and system by which a communicating device (DEV) may transmit a portion of a protocol data unit (PDU) utilizing omnidirectionally transmitted signals and a subsequent portion of the PDU utilizing directionally transmitted signals. In an exemplary embodiment of the invention, the communicating DEV may transmit a frame, which represents a physical layer PDU. The frame may comprise a PLCP preamble that is transmitted via omnidirectional signals (omni preamble), a PLCP header that is transmitted via omnidirectional signals (omni header), a PLCP preamble that is transmitted utilizing directionally transmitted signals (directional preamble) and a physical layer service data unit (PSDU) field, or data, field, which is transmitted utilizing directionally transmitted signals (directional data).

The omni header field may comprise a network allocation vector (NAV) value. The NAV value may be utilized by recipient DEVs, which receive the transmitted frame, to determine a soonest time instant at which the recipient DEV may attempt to access the wireless communication medium. In another aspect, a communicating DEV may compute a NAV value based on a determined maximum data field length (MAX_PAYLOAD), a minimum data rate (MIN_DATA_RATE) and a maximum transmission opportunity time duration for the wireless communication medium (MAX_TXOP).

Various embodiments of the invention may be practiced for direct data transfers (DDT), in which the transmitting DEV attempts to access the wireless communication medium by transmitting frames, or for control guided data transfers (CGDT), in which the transmission of frames is preceded by an RTS/CTS frame exchange. In the CGDT case, the transmitting DEV may transmit PDUs utilizing directional signal transmission.

Figure 1:
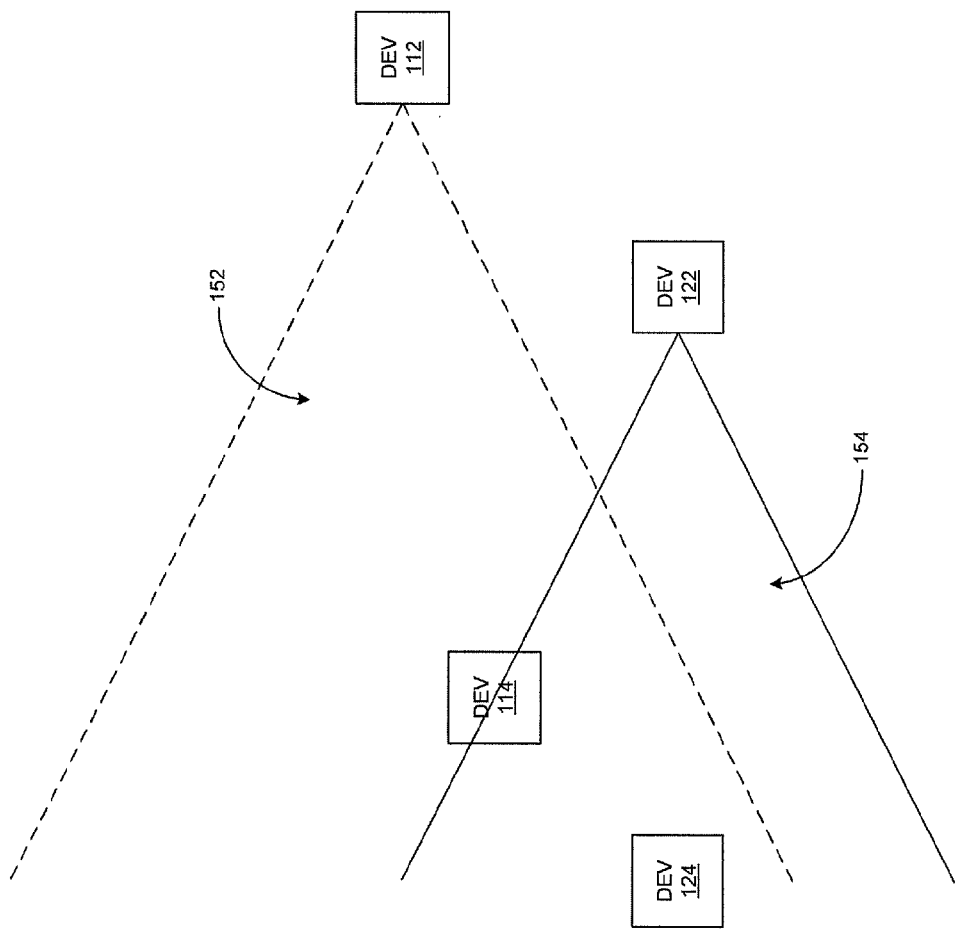
FIG. 1 is diagram of an exemplary wireless communication system with directional transmission, which may be utilized in connection with an embodiment of the invention.

FIG. 1 is diagram of an exemplary wireless communication system with directional transmission, which may be utilized in connection with an embodiment of the invention. Referring to FIG. 1, there is shown a plurality of communicating DEVs 112, 114, 122 and 124 and a plurality of RF coverage areas 152 and 154. In the exemplary FIG. 1, the DEV 112 and the DEV 114 are engaged in a communication and the DEV 122 and the DEV 124 are engaged in a separate communication. As shown in FIG. 1, the DEV 112 transmits directional signals within coverage area 152 and the DEV 122 transmits directional signals within coverage area 154. Signals transmitted by the DEV 112 may be received by the DEV 114 and/or the DEV 124. Signals transmitted by the DEV 122 may also be received by the DEV 114 and/or the DEV 124. As shown in FIG. 1, the DEV 112 is not located within the coverage area 154 and the DEV 122 is not located within the coverage area 152. Consequently, the DEV 112 may not receive signals transmitted by the DEV 122 and the DEV 122 may not receive signals transmitted by DEV 112.

The CSMA/CA protocol may not be operable to prevent concurrent signal transmission by the DEV 112 and the DEV 122 because signals transmitted by the DEV 112 may not be detected by the DEV 122 and signals transmitted by the DEV 122 may not be detected by the DEV 112. This is an example of deafness.

Due to the deafness phenomenon, there is a possibility that the DEV 112 may attempt to communicate with the DEV 114 while the DEV 122 is concurrently attempting to communicate with the DEV 124. Thus, the DEV 114 and the DEV 124 may each concurrently receive signals transmitted by the DEV 112 and the DEV 122. The concurrent reception of a plurality of transmitted signals is referred to as a collision. In an exemplary signal transmission, a signal level for signals received at the DEV 124 and transmitted from the DEV 122 may be higher than a signal level for signals received at the DEV 124 and transmitted from the DEV 112. In instances where the signal to interference plus noise ratio (SINR) for signals transmitted by the DEV 122 is sufficiently high to enable the receiving DEV 124 to detect the data transmitted by DEV 122 (where DEV 124 is the destination DEV) via the received signals, the concurrent transmission of signals by the DEV 112 and the DEV 122 does not impair the ability of the DEV 122 and the DEV 124 to communicate via the wireless communication medium. Accordingly, there is no capture.

In an exemplary signal transmission, a signal level for signals received at the DEV 114 and transmitted from the DEV 122 may be higher than a signal level for signals received at the DEV 114 and transmitted from the DEV 112. In this case, the concurrent transmission of signals by the DEV 112 and the DEV 122 may impair the ability of the DEV 122 and the DEV 124 to communicate via the wireless communication medium. In instances where the SINR for signals transmitted by the DEV 122 is sufficiently high to enable the receiving DEV 114 to detect the data transmitted by the DEV 122 (where the DEV 124 is the destination DEV) via the received signals, the DEV 114 may receive data transmitted from a source DEV, DEV 122, for which the destination DEV is DEV 124. This illustrates an example of capture by the DEV 114.

As described above in connection with the exemplary FIG. 1, deafness and capture may result in impairment of the ability of at least a portion of the DEVs to communicate via a wireless communication medium.

Figure 2:
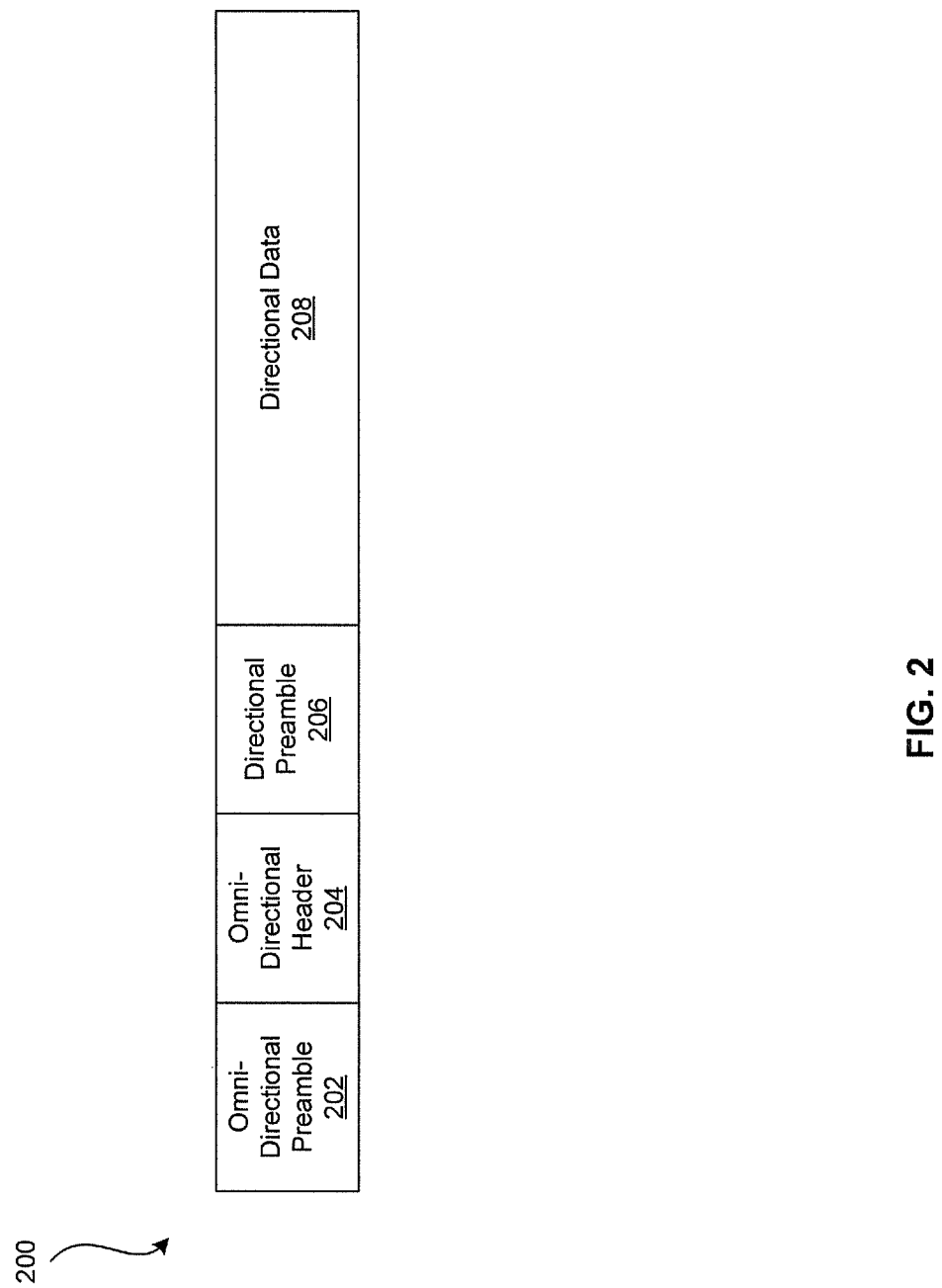
FIG. 2 is a diagram of an exemplary frame for CSMA/CA with directional signal transmission, in accordance with an embodiment of the invention.

FIG. 2 is a diagram of an exemplary frame for CSMA/CA with directional signal transmission, in accordance with an embodiment of the invention. Referring to FIG. 2, there is shown a frame 200. The frame 200 comprises an omni-directional (omni) preamble field 202, an omni header field 204, a directional preamble field 206, and a directional data field 208.

In an exemplary embodiment of the invention, the frame 200 corresponds to a physical layer PDU. The omni preamble field 202 comprises a frame preamble field, which is transmitted by a transmitting DEV, for example the DEV 122, using omni-directional signal transmission. The omni header field 204 comprises a frame header field, which is transmitted by a transmitting DEV using omni-directional signal transmission. The directional preamble field 206 comprises a frame preamble field, which is transmitted by a transmitting DEV using directional signal transmission. In various embodiments of the invention, the contents of the omni preamble field 202 (as represented by a plurality of binary values, for example) may be identical to the contents of the directional preamble field 206, but various embodiments of the invention are not so limited. The directional data field 208 comprises a data field, which is transmitted by a transmitting DEV using directional signal transmission. The data field 208 may correspond to a payload, or service data unit (SDU), portion of the frame 200. In various embodiments of the invention, the directional data field 208 comprises data which are being communicated from a source DEV, for example the DEV 122, to a destination DEV, for example DEV 124, via a wireless communication medium.

Figure 3:
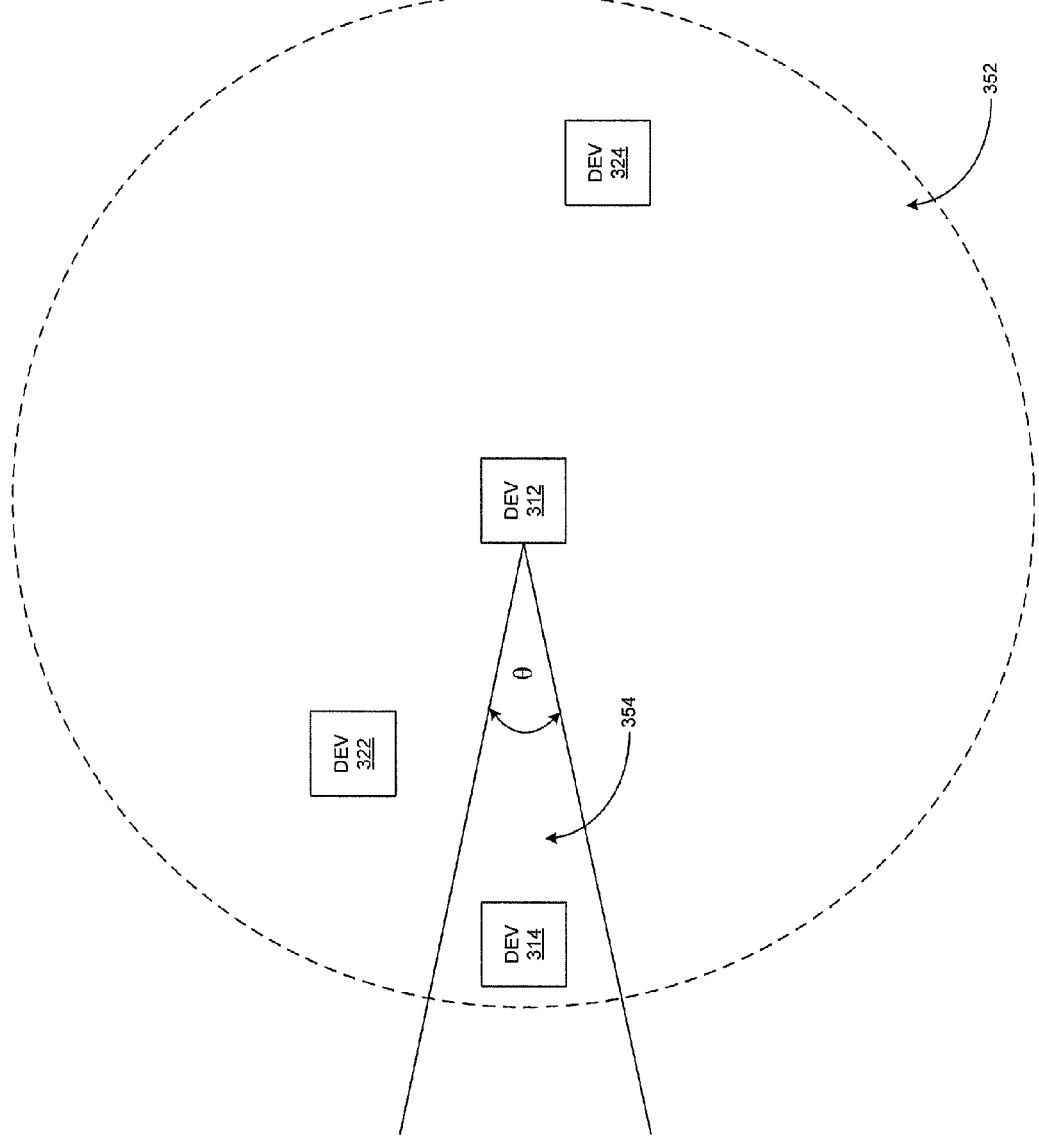
FIG. 3 is a diagram illustrating exemplary signal transmission for CSMA/CA with directional signal transmission, in accordance with an embodiment of the invention.

FIG. 3 is a diagram illustrating exemplary signal transmission for CSMA/CA with directional signal transmission, in accordance with an embodiment of the invention. Referring to FIG. 3, there is shown a plurality of communicating devices DEV 312, DEV 314, DEV 322 and DEV 324, an omnidirectional RF coverage area 352 and a directional RF coverage area 354. The directional coverage area 354 may be characterized by a coverage angle θ. The coverage area 354 and its position relative to coverage area 352 is presented in FIG. 3 for illustrative purposes and is not intended to limit the practice of various embodiments of the invention.

The DEV 312 may be operable to transmit signals omni-directionally within the coverage area 352 and may transmit signals directionally within the coverage area 354. As shown in FIG. 3, the DEV 314, the DEV 322 and the DEV 324 are located within the coverage area 352. Consequently, the DEV 314, the DEV 322 and the DEV 324 may receive signals that are transmitted within the coverage area 352. As shown in FIG. 3, the DEV 314 is located within coverage area 354. Consequently, the DEV 314 may receive signals transmitted within the coverage area 354 while the DEV 322 and the DEV 324 may not receive signals transmitted within the coverage area 354.

In various embodiments of the invention, the DEV 312 may transmit a portion of frame 200 within the coverage area 352 and may transmit a subsequent portion of frame 200 within coverage area 354. For example, the DEV 312 may transmit the omni preamble field 202 and the omni header field 204 within coverage area 352. The DEV 312 may transmit the directional preamble field 206 and the directional data field 208 within coverage area 354.

By transmitting the omni preamble field 202 and the omni header field 204 within coverage area 352, the DEV 314, the DEV 322 and the DEV 324 may detect the transmitted preamble field 202 and/or header field 204, thereby addressing the deafness phenomenon. Receipt of the preamble field 202 and/or header field 204 may enable the DEV 322 and the DEV 324 to detect that the DEV 312 is attempting to access the wireless communication medium. Accordingly, the DEV 322 and the DEV 324 may refrain from attempting to access the wireless communication medium in accordance with the CSMA/CA protocol. Consequently, the DEV 322 and/or the DEV 324 may not transmit signals via the wireless communication medium concurrently with signal transmissions from DEV 312. This, in turn, reduces the likelihood of collisions, thereby addressing the capture phenomenon.

In various embodiments of the invention, the header field 204 may comprise a network allocation vector (NAV) value. The NAV value may be utilized by a recipient DEV to determine the next time instant at which that the recipient DEV may attempt to access the wireless communication medium. For example, the DEV 322 may determine a NAV value based on a received omni header 204, which was transmitted by the DEV 312. Based on the determined NAV value, the DEV 322 may determine a time duration during which the DEV may refrain from attempting to access the wireless communication medium.

A DEV 322, which attempts to access the wireless communication medium, may determine that a collision occurred during the access attempt. In various embodiments of the invention, upon determining that a collision may have occurred, the DEV may compute a NAV value. Based on the computed NAV value, the DEV may refrain from attempting to make a subsequent attempt to access the wireless communication medium until the expiration of a time duration, which is based on the computed NAV value. This time duration is referred to as a backoff interframe spacing (BaIFS) interval. In various embodiments of the invention, a BaIFS value may be computed as follows:

$$BaIFS = \max\left(\frac{MAX\_PAYLOAD}{MIN\_DATA\_RATE}, MAX\_TXOP\right)$$

where MAX_PAYLOAD represents the maximum length (as measured in octets, for example) of a payload portion of a PDU, MIN_DATA_RATE represents the minimum data rate (as measured in bits per second, for example) at which data may be transmitted via a wireless communication medium, and MAX_TXOP represents a maximum transmission opportunity (TXOP), or maximum time duration (as measured in seconds, for example) for which a DEV may reserve continuous access to the wireless communication medium for signal transmission. Values for MAX_PAYLOAD, MIN_DATA_RATE and/or MAX_TXOP may be specified, for example, in a standards document or other specifications document.

Figure 4:
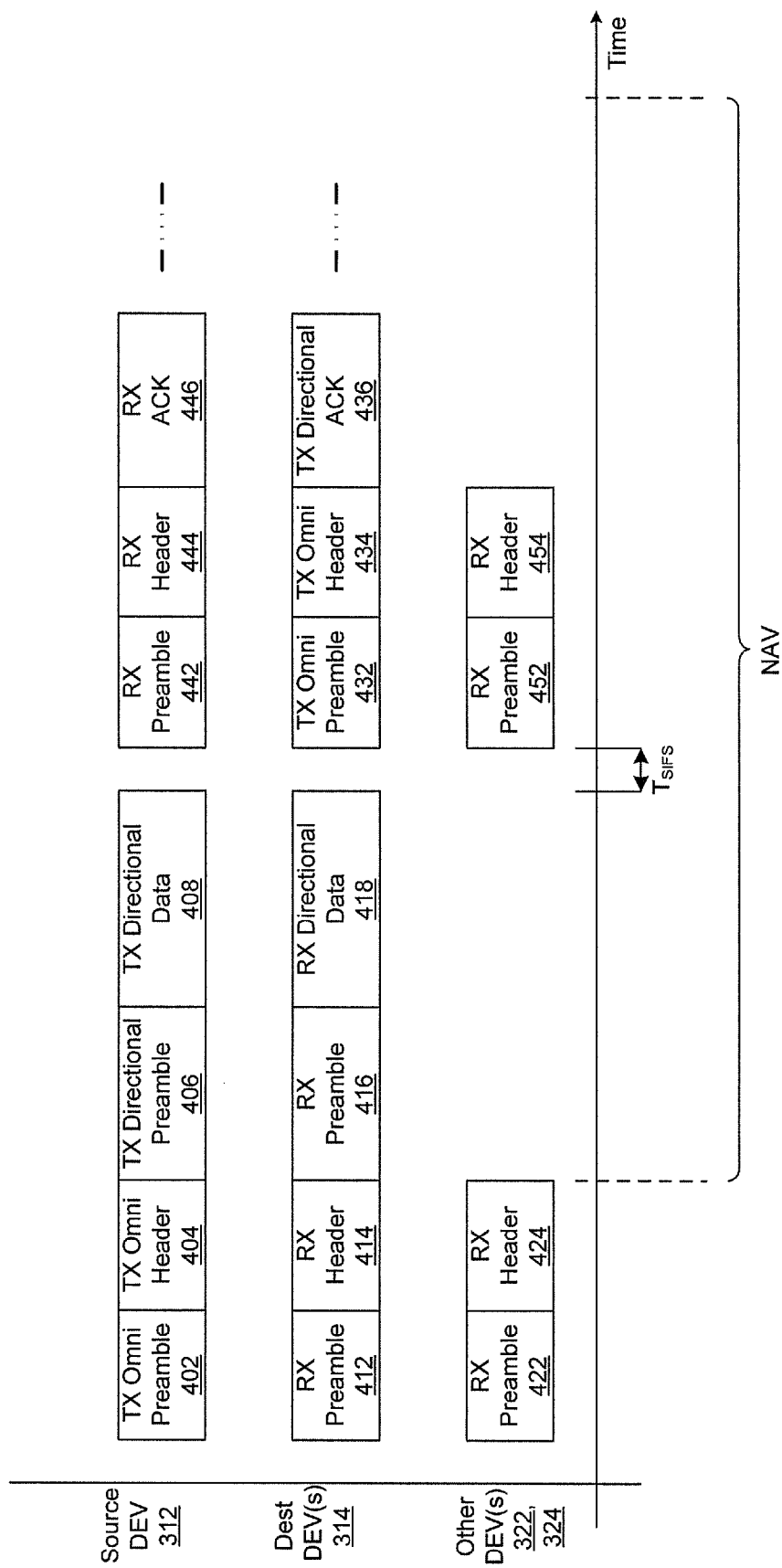
FIG. 4 is a diagram, which illustrates an exemplary direct data transfer sequence, in accordance with an embodiment of the invention.

FIG. 4 is a diagram, which illustrates an exemplary direct data transfer sequence, in accordance with an embodiment of the invention. Referring to FIG. 4, there is shown a source DEV 312 (FIG. 3), a destination (dest) DEV 314 and a plurality of other DEVs 322 and 324. The source DEV 312 and the dest DEV 314 may be engaged in a communication. The source DEV 312 may transmit frames 200 as shown in FIG. 2. Communications between DEVs may be based on direct data transfers (DDT). In a DDT communication, the transmitting DEV may commence transmission of a frame 200 comprising a data field 208, via the wireless communication medium, without transmitting preceding frames, such as request to send (RTS) frames.

As shown in the exemplary FIG. 4, the source DEV 312 transmits an omni preamble field 402 using omnidirectional signal transmission. Signals transmitted by the DEV 312 using omnidirectional signal transmission may be transmitted within coverage area 352. The transmitted omni preamble field 402 is received as preamble field 412 by the dest DEV 314 and as preamble field 422 by the DEV 322 and the DEV 324. The source DEV 312 transmits an omni header field 404 using omnidirectional signal transmission. The transmitted omni header field 404 is received as header field 414 by the dest DEV 314 and as header field 424 by the DEV 322 and the DEV 324.

In various embodiments of the invention, the transmitted header field 404 may comprise a NAV value. The other DEVs, DEV 322 and/or DEV 324, may utilize the received NAV value to determine a time during after which the wireless communication medium may become available for an access attempt. This time duration is indicated in FIG. 4 by the bracket labeled NAV.

The source DEV 312 transmits a directional preamble field 406 using directional signal transmission. Signals transmitted by the DEV 312 using directional signal transmission may be transmitted within coverage area 354. The transmitted directional preamble field 406 is received as preamble field 416 by the dest DEV 314. The transmitted directional preamble field 406 may not be received by either the DEV 322 or the DEV 324. The source DEV 312 transmits a directional data field 408 using directional signal transmission. The transmitted directional data field 408 is received as data field 418 by the dest DEV 314.

The dest DEV 314 may acknowledge successful receipt of a frame 200 from the source DEV 312 by transmitting an acknowledgment (ACK) frame. As shown in FIG. 4, the dest DEV 314 transmits an omni preamble field 432 using omnidirectional signal transmission. There may be a minimum time duration between the receipt of the data field 418 and the transmission of the preamble field 422. In an exemplary embodiment of the invention, the minimum time duration is referred to as a short interframe spacing (SIFS) interval. The SIFS interval is indicated in FIG. 4 as $T_{SIFS}$. The transmitted omni preamble field 432 is received as preamble field 442 by source DEV 312 and as preamble field 452 by DEV 322 and DEV 324. The dest DEV 314 transmits an omni header field 434 using omnidirectional signal transmission. The transmitted omni header field 434 is received as header field 444 by the source DEV 312 and as header field 454 by the DEV 322 and the DEV 324.

The dest DEV 314 transmits a directional ACK field 436 using directional signal transmission. The transmitted directional ACK field 436 is received as ACK field 446 by the source DEV 312. The transmitted directional ACK field 436 may not be received by either the DEV 322 or the DEV 324.

Figure 5:
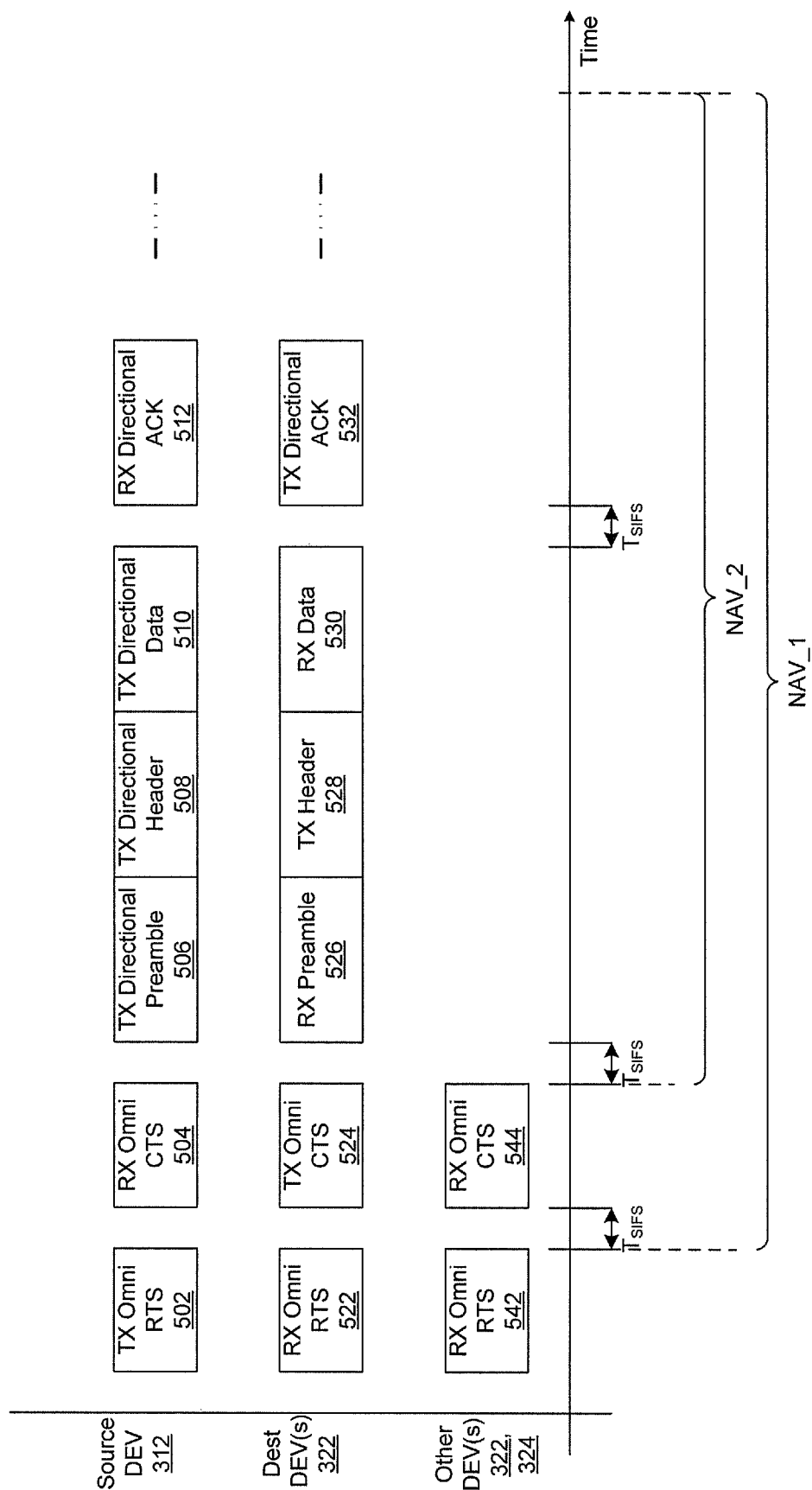
FIG. 5 is a diagram, which illustrates an exemplary control guided data transfer sequence, in accordance with an embodiment of the invention.

FIG. 5 is a diagram, which illustrates an exemplary control guided data transfer sequence, in accordance with an embodiment of the invention. Referring to FIG. 5, there is shown a source DEV 312 (FIG. 3), a destination (dest) DEV 314 and a plurality of other DEVs 322 and 324. The source DEV 312 and the dest DEV 314 may be engaged in a communication. The source DEV 312 may transmit frames 200 as shown in FIG. 2. Communications between DEVs may be based on control guided data transfers (CGDT). In a CGDT communication, the transmitting DEV may transmit an RTS frame to a recipient DEV to request reservation of the wireless communication medium. The time duration for the reservation may be referred to as a TXOP time duration. The transmitting DEV may commence transmission of a frame 200 comprising a data field 208, via the wireless communication medium, after receiving a response to the transmitted RTS frame from the recipient DEV, such as a clear to send (CTS) frame.

As shown in the exemplary FIG. 5, the source DEV 312 transmits an omni RTS frame 502 using omnidirectional signal transmission. The transmitted omni RTS frame 502 is received an RTS frame 522 by the dest DEV 314 and as RTS frame 542 by the DEV 322 and the DEV 324. Following at least a SIFS interval, subsequent to the receipt of RTS frame 522, the dest DEV 322 transmits an omni CTS frame 524 using omnidirectional signal transmission. The transmitted omni CTS frame 524 is received as CTS frame 504 by dest DEV 314 and as CTS frame 544 by DEV 322 and DEV 324.

In various embodiments of the invention, the transmitted RTS frame 502 may comprise a NAV value. The other DEVs, DEV 322 and/or DEV 324, may utilize the received NAV value to determine a time during after which the wireless communication medium may become available for an access attempt. This time duration is indicated in FIG. 5 by the bracket labeled NAV_1. In various embodiments of the invention, the transmitted CTS frame 524 may comprise a NAV value. the DEV 322 and/or the DEV 324 may utilize the NAV value received in a CTS frame to determine a time duration, which is indicated in FIG. 5 by the bracket labeled NAV_2.

Following at least a SIFS interval, the source DEV 312 transmits a directional preamble field 506 using directional signal transmission. Signals transmitted by the DEV 312 using directional signal transmission may be transmitted within coverage area 354. The transmitted directional preamble field 506 is received as preamble field 526 by the dest DEV 314. The transmitted directional preamble field 506 may not be received by either the DEV 322 or the DEV 324. The source DEV 312 transmits a directional header field 408 using directional signal transmission. The transmitted directional header field 508 is received as header field 528 by the dest DEV 314. The source DEV 312 transmits a directional data field 510 using directional signal transmission. The transmitted directional data field 510 is received as data field 530 by dest DEV 314.

Following at least a SIFS interval, the dest DEV 314 may acknowledge successful receipt of a frame 200 from the source DEV 312 by transmitting an ACK frame 532. The transmitted directional ACK frame 532 is received as ACK frame 512 by the source DEV 312. The transmitted directional ACK frame 532 may not be received by either the DEV 322 or the DEV 324.

Following the receipt of the ACK frame 512, one or more subsequent frames 200 may be transmitted by the source DEV 312 and/or by the dest DEV 322, substantially as described above, during the current TXOP time duration.

In various embodiments of the invention as applied to CGDT communication, a transmitting DEV may transmit frames by utilizing any of a plurality of methods, or efficiency modes. In an exemplary embodiment of the invention, the transmitting DEV may receive an ACK frame for each transmitted frame. In other words, the transmitting DEV, which seeks to transmit a plurality of frames to a recipient DEV, may transmit a single frame 200 to the recipient DEV and wait to receive an ACK frame before transmitting a subsequent frame.

Figure 6:
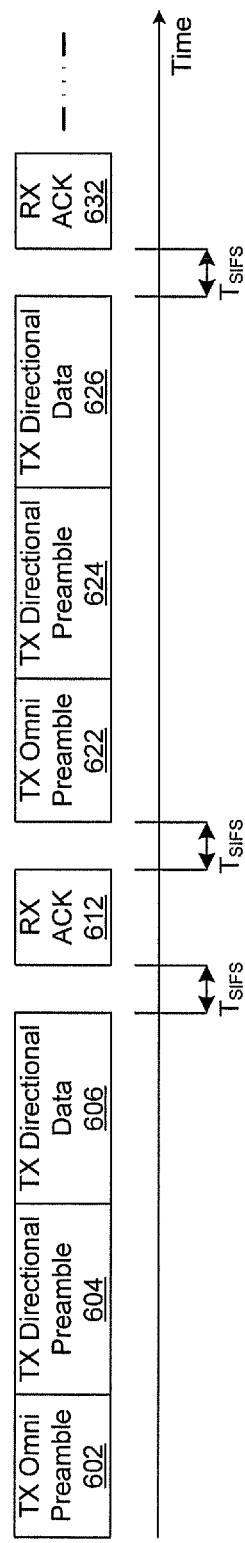
FIG. 6 is a diagram, which illustrates an exemplary control guided data transfer sequence with single acknowledgment and omnidirectional preamble transmission, in accordance with an embodiment of the invention.

FIG. 6 is a diagram, which illustrates an exemplary control guided data transfer sequence with single acknowledgment and omnidirectional preamble transmission, in accordance with an embodiment of the invention. Referring to FIG. 6, there is shown a sequence of transmitted frames and received frames from the perspective of a single transmitting DEV, such as the DEV 312. The transmitting DEV may transmit a frame comprising an omni preamble field 602 using omnidirectional signal transmission, a directional preamble field 604 using directional signal transmission, and a directional data field 606 using directional signal transmission. The transmitting DEV may receive an ACK frame 612 in response to the previously transmitted frame. Subsequent to receipt of the ACK frame 612, the transmitting DEV may transmit a subsequent frame comprising an omni preamble field 622, a directional preamble field 624 and a directional data field 626. The transmitting DEV may receive a subsequent ACK frame 632 in response to the subsequent transmitted frame. Succeeding frames may be transmitted and acknowledged as described above.

In another exemplary embodiment of the invention, the transmitting DEV may receive an ACK frame for each transmitted frame. In this case, however, the transmitting DEV may transmit a frame comprising an omni preamble field using omnidirectional signal transmission for the first frame transmitted during a TXOP interval, while subsequent frames, which are transmitted by the transmitting DEV during the TXOP interval, may be transmitted without an omni preamble field.

Figure 7:
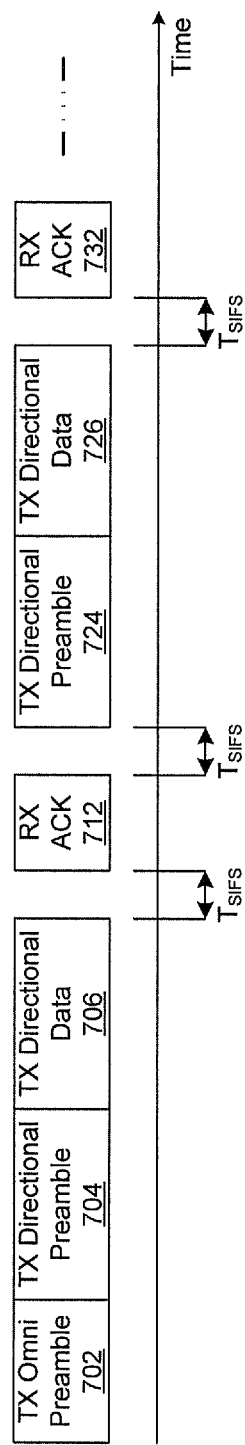
FIG. 7 is a diagram, which illustrates an exemplary control guided data transfer sequence with single acknowledgment and without omnidirectional preamble transmission, in accordance with an embodiment of the invention.

FIG. 7 is a diagram, which illustrates an exemplary control guided data transfer sequence with single acknowledgment and without omnidirectional preamble transmission, in accordance with an embodiment of the invention. Referring to FIG. 7, there is shown a sequence of transmitted frames and received frames from the perspective of a single transmitting DEV, such as DEV 312. The transmitting DEV may transmit a frame comprising an omni preamble field 702 using omnidirectional signal transmission, a directional preamble field 704 using directional signal transmission, and a directional data field 706 using directional signal transmission. The transmitting DEV may receive an ACK frame 712 in response to the previously transmitted frame. Subsequent to receipt of the ACK frame 712, the transmitting DEV may transmit a subsequent frame comprising a directional preamble field 724 and a directional data field 726. The transmitting DEV may receive a subsequent ACK frame 732 in response to the subsequent transmitted frame. Succeeding frames transmitted by the transmitting DEV during a current TXOP interval may be transmitted without an omni preamble field and acknowledged as described above.

In another exemplary embodiment of the invention, the transmitting DEV may receive a single ACK frame after transmission of a plurality of frames. The single ACK frame, which acknowledges receipt by the recipient DEV of a plurality of frames, is referred to as a block acknowledgment (block ACK).

Figure 8:
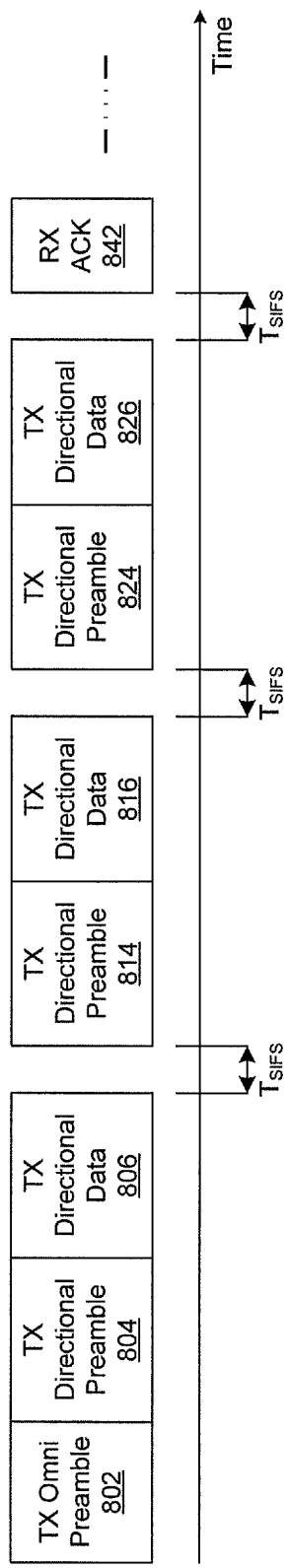
FIG. 8 is a diagram, which illustrates an exemplary control guided data transfer sequence with block acknowledgment, in accordance with an embodiment of the invention.

FIG. 8 is a diagram, which illustrates an exemplary control guided data transfer sequence with block acknowledgment, in accordance with an embodiment of the invention. Referring to FIG. 8, there is shown a sequence of transmitted frames and received frames from the perspective of a single transmitting DEV, such as the DEV 312. The transmitting DEV may transmit a frame comprising an omni preamble field 802 using omnidirectional signal transmission, a directional preamble field 804 using directional signal transmission, and a directional data field 806 using directional signal transmission. Subsequent to transmission of the frame, the transmitting DEV may transmit a succeeding frame comprising a directional preamble field 814 and a directional data field 816. Subsequent to transmission of the succeeding frame, the transmitting DEV may transmit a subsequent frame comprising a directional preamble field 824 and a directional data field 826. The transmitting DEV may receive a subsequent ACK frame 842 in response to the plurality of transmitted frames. Succeeding frames transmitted by the transmitting DEV during a current TXOP interval may be transmitted without an omni preamble field and acknowledged, either by single ACK frames and/or by block ACK frames, as described above.

Figure 9:
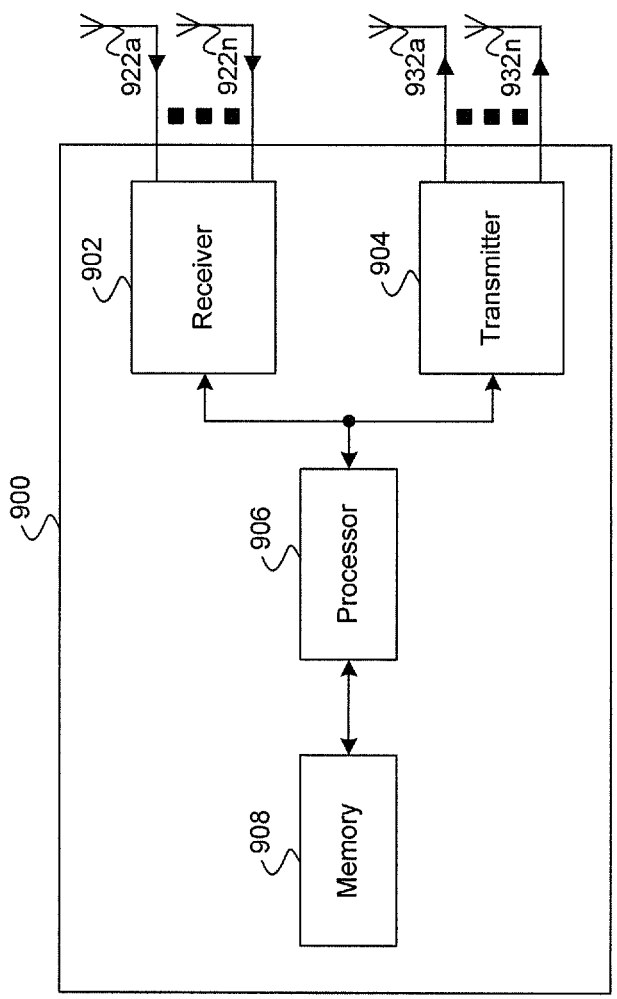
FIG. 9 is a diagram of an exemplary transceiver comprising a plurality of transmitting antennas and a plurality of receiving antennas, which may be utilized for carrier sense multiple access with collision avoidance (CSMA/CA) with directional transmission, in accordance with an embodiment of the invention.

FIG. 9 is a diagram of an exemplary transceiver comprising a plurality of transmitting antennas and a plurality of receiving antennas, which may be utilized for carrier sense multiple access with collision avoidance (CSMA/CA) with directional transmission, in accordance with an embodiment of the invention. Referring to FIG. 9, there is shown a transceiver system 900, a plurality of receiving antennas 922a, ..., 922n and a plurality of transmitting antennas 932a, ..., 932n. The transceiver system 900 may be exemplary of any of the DEVs 312, 314, 322, and/or 324. The transceiver system 900 may comprise at least a receiver 902, a transmitter 904, a processor 906, and a memory 908. Although a transceiver is shown in FIG. 9, transmit and receive functions may be separately implemented.

The receiver 902 may perform receiver functions that may comprise, but are not limited to, the amplification of received RF signals, generation of frequency carrier signals corresponding to selected RF channels, for example uplink channels, the down-conversion of the amplified RF signals by the generated frequency carrier signals, demodulation of data contained in data symbols based on application of a selected demodulation type, and detection of data contained in the demodulated signals. The RF signals may be received via one or more receiving antennas 922a, ..., 922n. The data may be communicated to the processor 906.

The transmitter 904 may perform transmitter functions that may comprise, but are not limited to, modulation of received data to generated data symbols based on application of a selected modulation type, generation of frequency carrier signals corresponding to selected RF channels, for example downlink channels, the up-conversion of the data symbols by the generated frequency carrier signals, and the generation and amplification of RF signals. The data may be received from the processor 906. The RF signals may be transmitted via one or more transmitting antennas 932a, ..., 932n.

In various embodiments of the invention, one or more of the receiving antennas 922a ... 922n may be operable for directional and/or omnidirectional reception of signals. One or more of the transmitting antennas 932a, ..., 932n may be operable for directional and/or omnidirectional transmission of signals.

The memory 908 may comprise suitable logic, circuitry, interfaces and/or code that may enable storage and/or retrieval of data and/or code. The memory 908 may utilize any of a plurality of storage medium technologies, such as volatile memory, for example random access memory (RAM), and/or non-volatile memory, for example electrically erasable programmable read only memory (EEPROM). In the context of the present application, the memory 908 may enable storage of code for the determining when to transmit frame fields using omnidirectional signal transmission and when to transmit frame fields using directional signal transmission, for example. The memory may also enable the storage of received NAV values and/or computed BaIFS values. The memory 908 may enable storage of training sequences utilized in preamble fields.

In operation, the processor 906 may configure a transmitter 904 for transmission of omnidirectional signals and/or directional signals, for example. The configuration of the transmitter 904 may enable the transmitter 904 to select transmitting antennas, among the plurality of transmitting antennas 932a, ..., 932n, to enable omnidirectional signal transmission and/or to enable directional signal transmission in a determined direction and/or with a determined coverage angle θ. The processor 906 may enable determination of when to utilize DDT communication and/or CGDT communication, for example. The processor 906 may enable determination of when a transmitting DEV is to utilize single ACK frame transmission and/or when to utilize block ACK frame transmission. The processor 906 may also enable the transmission and processing of RTS frames, CTS frames, training sequences, data frames comprising NAV values and/or the transmission and processing of other PDUs transmitted by the transceiver 300. The processor 906 may enable selection of transmitting antennas 932a, ..., 932n and/or receiving antennas 922a, ..., 922n for directional (or sectorized) signal transmission and/or reception.

In an exemplary embodiment of the invention, the processor 906 may configure the transmitter 904 to concurrently transmit omnidirectional signals and directional signals. In a transceiver system 900, which utilizes orthogonal frequency division multiplexing (OFDM), the processor 906 may configure the transmitter to select frequency carriers within an OFDM RF channel bandwidth that are to be utilized for omnidirectional signal transmission. Remaining frequency carriers within the OFDM RF channel bandwidth may be utilized for directional signal transmission. Based on signals received by the receiver 902, the processor 906 may compute channel estimates, which characterize the wireless communication medium. The computed channel estimates may be utilized to determine a coherence bandwidth for the wireless communication medium. The processor 906 may select individual frequency carriers within the OFDM RF channel bandwidth wherein the frequency difference between each such selected frequency carrier is greater than the computed coherence bandwidth. These selected frequency carriers may be utilized for omnidirectional signal transmission while the remaining frequency carriers are utilized for directional signal transmission. The processor 906 may configure the transmitter 904 to select one or more transmitting antennas, among the plurality of transmitting antennas 932a, ..., 932n, for transmission of omnidirectional signals while a subsequent one or more transmitting antennas, selected among the plurality of transmitting antennas 932a, ..., 932n, may be utilized for directional signal transmission. For example, the processor 906 may configure the transmitter 904 to transmit omnidirectional signals via the selected frequency carriers, while the transmitter 904 is transmitting a data field 208 using directional signal transmission via at least a portion of the remaining frequency carriers.

Figure 10:
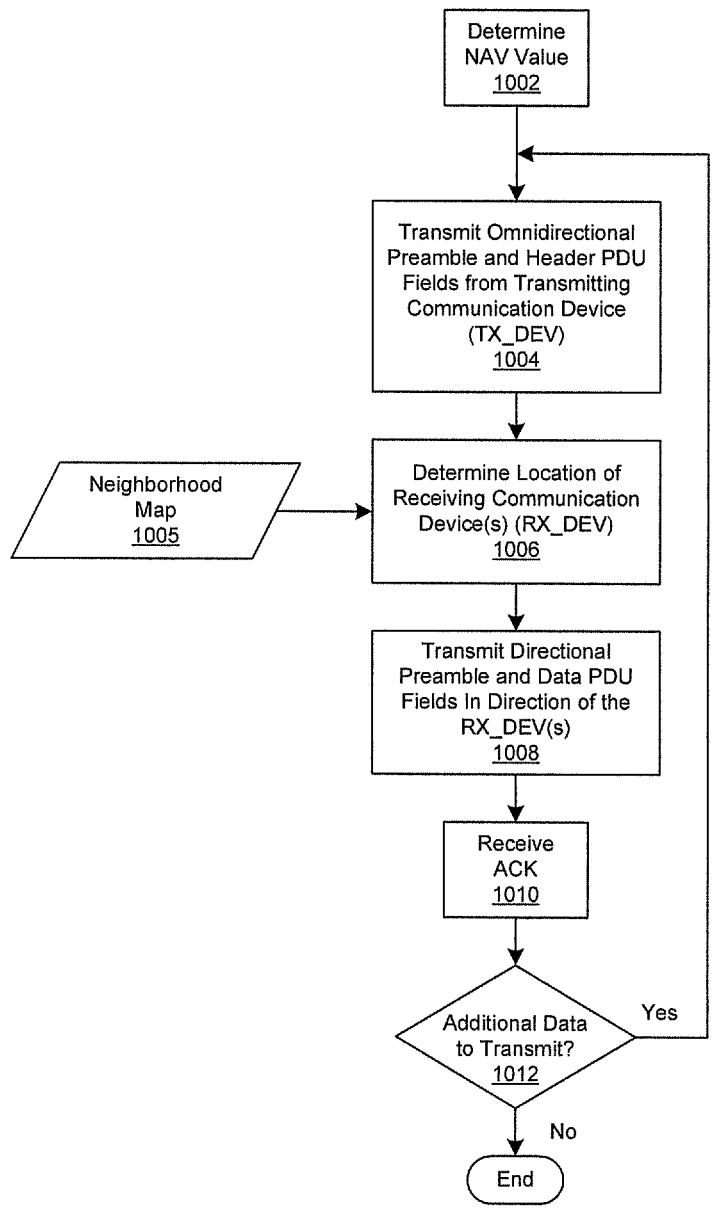
FIG. 10 is a flowchart that illustrates exemplary steps for direct data transfer communication in a transmitting system for CSMA/CA with directional transmission, in accordance with an embodiment of the invention.

FIG. 10 is a flowchart that illustrates exemplary steps for direct data transfer communication in a transmitting system for CSMA/CA with directional transmission, in accordance with an embodiment of the invention. Referring to FIG. 10, in step 1002, a processor 906, which is utilized in connection with a transmitting DEV 312, may determine a network allocation value (NAV). The processor 906 may determine the NAV value based on a determined value, or based on signals received from other DEVs via receiving antenna(s) 922a, ..., 922n and the receiver 902. Examples of other DEVs, as shown in FIG. 3, comprise the DEV 314, the DEV 322 and/or the DEV 324. The processor 906 may send data comprising the determined NAV value to the transmitter 904. In step 1004, the processor 906 may configure the transmitter 904 to transmit an omni preamble field 202 and/or an omni header field 204 using omnidirectional signal transmission. The transmitted omni header field 204 may comprise the determined NAV value. The transmitter 904 may select one or more transmitting antennas, among the plurality of transmitting antennas 932a, ..., 932n, for the omnidirectional signal transmission.

In step 1006, prior to the commencement of directional signal transmission to a receiving DEV 314, the processor 906, which is utilized in connection with the transmitting DEV 312, may determine the location of the receiving DEV 314. In an exemplary embodiment of the invention, the processor, utilized in connection with the transmitting DEV 312, may determine the location of the receiving DEV 314 based on a neighborhood map (step 1005). The processor 906, which is utilized in connection with the transmitting DEV 312, may generate the neighborhood map based on communications with the DEVs, DEV 314, DEV 322 and/or DEV 324. The generated neighborhood map may be stored in memory 908, which is utilized in connection with the transmitting DEV 312.

A method and system for generation of neighborhood maps is described in U.S. patent application Ser. No. 12/397, 435, which is hereby incorporated herein by reference in its entirety.

In step 1008, the processor 906, which is utilized in connection with the transmitting DEV 312, may configure the transmitter 904 to transmit a directional preamble field 206 and/or directional data field 208 using directional signals, which may be transmitted in the direction of the receiving DEV 314. In an exemplary embodiment of the invention, the transmitter 904 may utilize one or more transmitting antennas 932a, ..., 932n, to transmit signals within coverage area 354.

In step 1010, the receiver 902, which is utilized in connection with the transmitting DEV 312, may receive an ACK frame, from the receiving DEV 314, via one or more receiving antennas 922a, ..., 922n. The receiver 902 may communicate the received ACK frame to the processor 906, which is utilized in connection with the transmitting DEV 312.

In step 1012, the processor 906, which is utilized in connection with the transmitting DEV 312, may determine whether there is additional data to transmit to the receiving DEV 314. In instances where there is additional data to transmit, step 1004 may follow step 1012.

Figure 11:
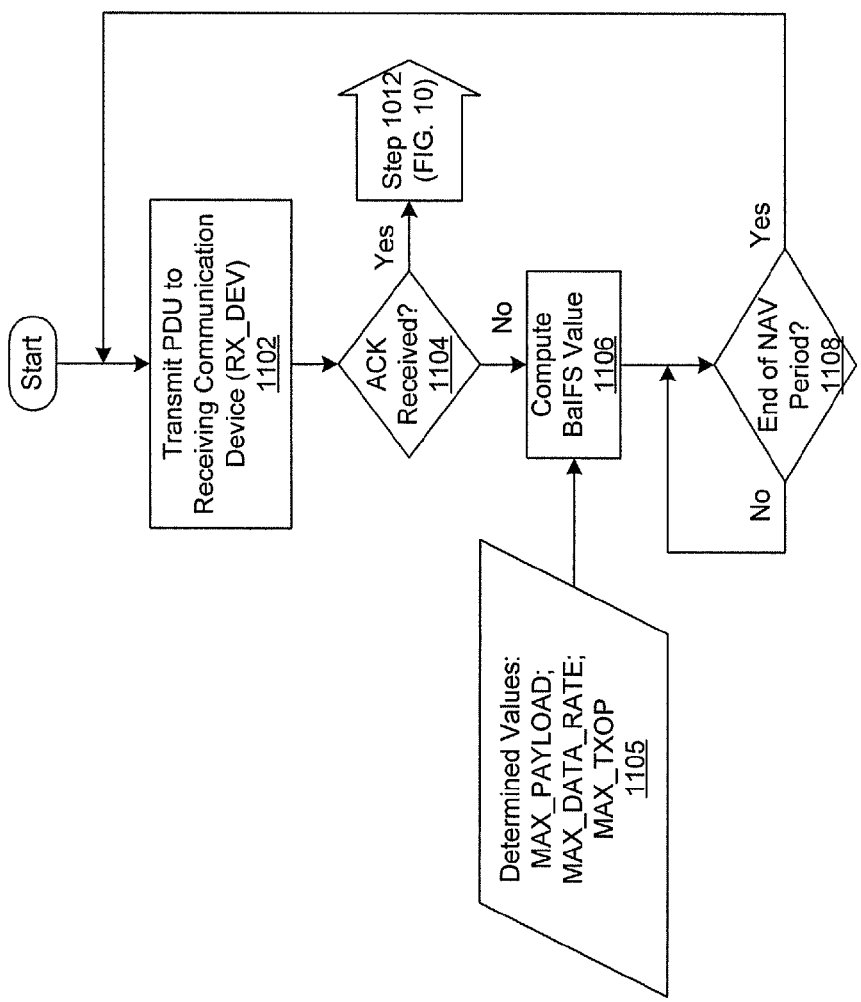
FIG. 11 is a flowchart that illustrates exemplary steps for collision backoff in a transmitting system for CSMA/CA with directional transmission, in accordance with an embodiment of the invention.

FIG. 11 is a flowchart that illustrates exemplary steps for collision backoff in a transmitting system for CSMA/CA with directional transmission, in accordance with an embodiment of the invention. Referring to FIG. 11, in step 1102, a transmitting DEV 324 may transmit a protocol data unit (PDU) to a receiving DEV 322. In an exemplary embodiment of the invention, the PDU comprises a frame 200. In step 1104, the processor 906, which is utilized in connection with the transmitting DEV 324, may determine whether an ACK frame has been received from the receiving DEV 322. In instances where an ACK frame has been received, step 1012 (FIG. 10) may follow step 1104.

In instances where an ACK frame has not been received, the processor 906, utilized in connection with the transmitting DEV 324, may determine that a collision has occurred during transmission of the frame 200. In step 1106, the processor 906, which is utilized in connection with the transmitting DEV 324, may compute a BaIFS value, as shown in equation [1] above, based on determined values MAX_PAYLOAD, MAX_DATA_RATE and/or MAX_TXOP (step 1105). The processor 906, which is utilized in connection with the transmitting DEV 324, may configure the transmitter 902 to refrain from transmitting signals until the expiration of a time duration, which is determined based on the computed BaIFS value. A NAV value may be determined based on the computed BaIFS value. In step 1108, the processor 906, which is utilized in connection with the transmitting DEV 324, may determine whether the NAV-determined time duration has expired. In instances where the NAV-determined time duration has not expired, the transmitter 902 may continue to refrain from transmitting signals from the transmitting DEV 324. In instances where the NAV-determined time duration has expired, the processor 906, which is utilized in connection with the transmitting Dev 324, may configure the transmitter 904 to transmit signals. Step 1102 may follow step 1108.

Figure 12:
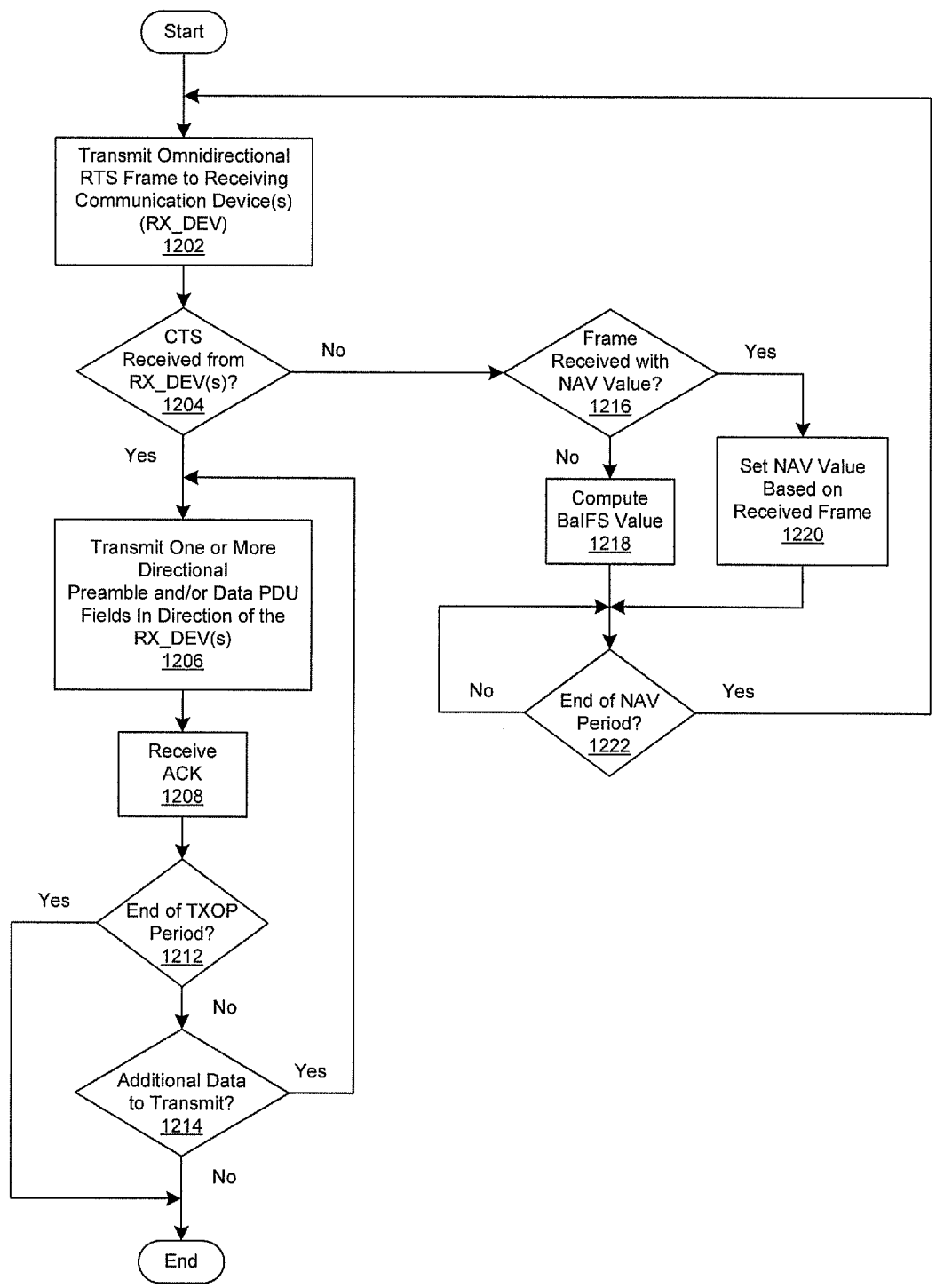
FIG. 12 is a flowchart that illustrates exemplary steps for control guided data transfer communication in a transmitting system for CSMA/CA with directional transmission, in accordance with an embodiment of the invention.

FIG. 12 is a flowchart that illustrates exemplary steps for control guided data transfer communication in a transmitting system for CSMA/CA with directional transmission, in accordance with an embodiment of the invention. Referring to FIG. 12, in step 1202, a processor 906, which is utilized in connection with a transmitting DEV 312, may configure a transmitter 904 to transmit an RTS frame, using omnidirectional signal transmission, to a receiving DEV 314. The transmitted RTS frame may comprise a NAV value and/or a requested TXOP interval time duration. In step 1204 the processor 906 may determine whether a CTS frame has been received from the receiving DEV 314. The processor 906, which is utilized in connection with the transmitting DEV 312, may receive a CTS frame from the receiving DEV 314 based on signals received via receiving antenna(s) 922a, . . . , 922n and the receiver 902. A received CTS frame may comprise an indicated TXOP interval time duration. In instances where a CTS frame has been received at step 1204, in step 1206, the processor 906, which is utilized in connection with the transmitting DEV 312, may configure the transmitter 904 to transmit a directional preamble field 206 and/or directional data field 208 using directional signals, which may be transmitted in the direction of the receiving DEV 314. The transmitter 906, which is utilized in connection with the transmitting DEV 312, may determine the location of the receiving DEV 314 based on the received CTS frame. In an exemplary embodiment of the invention, the transmitter 904 may utilize one or more transmitting antennas 932a, . . . , 932n, to transmit signals within coverage area 354. In instances in which the transmitting DEV 312 utilizes block acknowledgment, additional frames may be transmitted at step 1206.

In step 1208, the receiver 902, which is utilized in connection with the transmitting DEV 312, may receive an ACK frame, from the receiving DEV 314, via one or more receiving antennas 922a, . . . , 922n. The receiver 902 may communicate the received ACK frame to the processor 906, which is utilized in connection with the transmitting DEV 312. In step 1212, the processor 906, which is utilized in connection with the transmitting DEV 312, may determine whether the current TXOP interval has expired. In instances where the current TXOP interval has not expired, in step 1214, the processor 906, which is utilized in connection with the transmitting DEV 312, may determine whether there is additional data to transmit to the receiving DEV 314. In instances where there is additional data to transmit, step 1206 may follow step 1214.

In instances where a CTS frame has not been received at step 1204, the processor 906, which is utilized in connection with the transmitting DEV 312, may determine that a collision has occurred. The processor, which is utilized in connection with the transmitting DEV 312, may configure the transmitter 904 to refrain from attempting to transmit signals until a NAV-based time duration has expired. In step 1216, the processor 906, which is utilized in connection with the transmitting DEV 312, may determine whether a frame has been received, which comprises a NAV value. In instances where a frame comprising a NAV value has not been received at step 1216, in step 1218, the processor 906 may compute a BaIFS value, for example as shown in equation [1]. A NAV value may be determined based on the computed BaIFS value. In instances where a frame comprising a NAV value has been received at step 1216, in step 1220, the processor 906, which is utilized in connection with the transmitting DEV 312, may set a NAV value based on the NAV value contained in the received frame. At step 1222, the processor 906, which is utilized in connection with the transmitting DEV 312, may determine whether the NAV-based time duration has expired. In instances where the NAV-based time duration has not expired, the transmitter 904, which is utilized in connection with the transmitting DEV 312, may continue to refrain from transmitting signals. In instances where the NAV-based time duration has expired, step 1202 may follow step 1222.

Another embodiment of the invention may provide a machine and/or computer readable medium, having stored thereon, a computer program having at least one code section executable by a machine and/or computer, thereby causing the machine and/or computer to perform the steps as described herein for CSMA/CA with directional transmission.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for communicating data, the method comprising:
performing by one or more circuits:
transmitting, using a plurality of antennas, only a preamble field of a protocol data unit (PDU) via omnidirectional transmission of signals to a plurality of destination communication devices;
determining a location of one of the plurality of destination communication devices based on at least one of a neighborhood map or a signal sent by the one of the plurality of destination communication devices in response to the preamble field;
transmitting, using the plurality of antennas, said PDU, which includes another preamble field and a payload, in a direction of the one of the plurality of destination communication devices via directional transmission of signals; and
computing a backoff interframe spacing (BaIFS) value based on a maximum size for the payload of the PDU, a minimum data rate for transmitting the payload of the PDU and a maximum transmission opportunity interval time duration.

2. The method according to claim 1, further comprising:
transmitting a header field of the PDU via omnidirectional transmission of signals, the header field comprising a network allocation vector (NAV) value.

3. The method according to claim 2, wherein
the NAV value specifies a time duration for another one of the plurality of destination communication devices to refrain from transmitting a signal.

4. The method according to claim 1, further comprising:
transmitting the preamble field of the PDU within an omnidirectional coverage area; and
transmitting the preamble field and the payload of the PDU within a directional coverage area comprising a portion of the omnidirectional coverage area.

5. The method according to claim 1, further comprising:
determining a direction for the directional transmission of signals based on the determined location.

6. The method according to claim 1, further comprising:
determining whether an acknowledgment has been received in response to the transmitted preamble field of the PDU and/or to the transmitted payload of the PDU.

7. The method according to claim 6, further comprising:
computing the BaIFS value when determining that the acknowledgment has not been received.

8. A system for communicating data, the system comprising:
circuitry configured to
transmit, via a plurality of antennas, only a preamble field of a protocol data unit (PDU) via omnidirectional transmission of signals to a plurality of destination communication devices;
determine a location of one of the plurality of destination communication devices based on at least one of a neighborhood map or a signal sent by the one of the plurality of destination communication devices in response to the preamble field;
transmit the PDU, which includes another preamble field and a payload, in a direction of the one of the plurality of communication devices via directional transmission of signals using the plurality of antennas; and
compute a backoff interframe spacing (BaIFS) value based on a maximum size for the payload of the PDU, a minimum data rate for transmitting the payload of the PDU and a maximum transmission opportunity interval time duration.

9. The system according to claim 8, wherein
the circuitry is configured to transmit a header field of the PDU via omnidirectional transmission of signals, the header field including a network allocation vector (NAV) value.

10. The system according to claim 8, wherein the circuitry is configured to:
transmit the preamble field of the PDU within an omnidirectional coverage area; and
transmit the preamble field and the payload of the PDU within a directional coverage area comprising a portion of the omnidirectional coverage area.

11. The system according to claim 8, wherein the circuitry is configured to:
compute a channel estimate to determine a coherence bandwidth; and
select t frequency carriers for the directional transmission of signals according to the coherence bandwidth.

12. The system according to claim 8, wherein
the circuitry is configured to determine a direction for the directional transmission of signals based on said determined location.

13. The system according to claim 8, wherein
the circuitry is configured to determine whether an acknowledgment has been received in response to the transmitted preamble field of the PDU or the transmitted payload of the PDU.

14. The system according to claim 13, wherein
the circuitry is configured to compute the BaIFS value when determining that the acknowledgment has not been received.

15. The system according to claim 8, wherein
the circuitry is configured to transmit the preamble field and payload of the PDU using a plurality of orthogonal frequency division multiplexing (OFDM) subcarriers in a range between 57 GHz and 66 GHz.

16. The system according to claim 15, wherein the circuitry is configured to:
select a first plurality of the OFDM subcarriers for transmitting the preamble field of the PDU via the omnidirectional transmission; and
select a second plurality of the OFDM subcarriers for transmitting the preamble field and the payload of the PDU via the direction transmission of signals.

17. The system according to claim 8, wherein
the circuitry is configured to simultaneously transmit omnidirectional signals and directional signals.

18. The system according to claim 8, wherein
the circuitry is configured to compute the BaIFS as follows:

$$BaIFS = \left( \frac{MAX\_PAYLOAD}{MIN\_DATA\_RATE}, MAX\_TXOP \right)$$

where MAX_PAYLOAD is the maximum size for the payload of the PDU, MIN_DATA_RATE is the minimum date rate for transmitting the payload of the PDU, and MAX_TXOP is the maximum transmission opportunity interval time duration.

19. A system for communicating data, the system comprising:
- means for transmitting, via a plurality of antennas, only a preamble field of a protocol data unit (PDU) via omni-directional transmission of signals to a plurality of destination communication devices;
- means for determining a location of one of the plurality of destination communication devices based on at least one of a neighborhood map or a signal sent by the one of the plurality of destination communication devices in response to the preamble field;
- means for transmitting, using the plurality of antennas, the PDU, which includes said preamble field and a payload in a direction of the one of the plurality of destination communication devices via directional transmission of signals; and
- means for computing a backoff interframe spacing (BaIFS) value based on a maximum size for the payload of the PDU, a minimum data rate for transmitting the payload of the PDU and a maximum transmission opportunity interval time duration.

* * * * *

UNITED STATES PATENT AND TRADEMARK OFFICE
CERTIFICATE OF CORRECTION

| | |
|---|---|
| PATENT NO. | : 9,301,320 B2 |
| APPLICATION NO. | : 12/423589 |
| DATED | : March 29, 2016 |
| INVENTOR(S) | : Saishankar Nandagopalan |

It is certified that error appears in the above-identified patent and that said Letters Patent is hereby corrected as shown below:

On the title page, Item (54) and in the specification, Column 1, the Title is incorrect. Item (54) and Column 1 should read:

-- METHOD AND SYSTEM FOR CARRIER SENSE MULTIPLE ACCESS WITH COLLISION AVOIDANCE (CSMA/CA) WITH DIRECTIONAL TRANSMISSION--

Signed and Sealed this
Twenty-first Day of June, 2016

Michelle K. Lee
*Director of the United States Patent and Trademark Office*